United States Patent
White (10) Patent No.: US 6,999,749 B2
(45) Date of Patent: *Feb. 14, 2006

(54) CONDITIONAL APPLICATION INVOCATION IN A WIRELESS DEVICE

(75) Inventor: Christopher White, Redmond, WA (US)

(73) Assignee: Cingular Wireless II, LLC, Atlanta, GA (US)

(*) Notice: Subject to any disclaimer, the term of this patent is extended or adjusted under 35 U.S.C. 154(b) by 229 days.

This patent is subject to a terminal disclaimer.

(21) Appl. No.: 10/324,494

(22) Filed: Dec. 19, 2002

(65) Prior Publication Data

US 2004/0203955 A1 Oct. 14, 2004

(51) Int. Cl.
*H04M 11/00* (2006.01)
*H04M 15/00* (2006.01)

(52) U.S. Cl. .................. 455/406; 455/408; 455/414.1; 379/111; 379/114.03

(58) Field of Classification Search ............... 455/405, 455/406, 407, 408, 411, 414.1, 418, 419, 455/420; 379/111, 114.01, 114.03, 114.05, 379/114.06, 114.09, 114.1, 114.12, 130

See application file for complete search history.

(56) References Cited

U.S. PATENT DOCUMENTS

| | | | | |
|---|---|---|---|---|
| 5,794,140 A | * | 8/1998 | Sawyer | 455/408 |
| 5,799,072 A | * | 8/1998 | Vulcan et al. | 379/114.02 |
| 5,970,403 A | * | 10/1999 | Alperovich et al. | 455/406 |
| 5,974,308 A | * | 10/1999 | Vedel | 455/407 |
| 6,532,284 B1 | * | 3/2003 | Walker et al. | 379/144.06 |
| 6,564,047 B1 | * | 5/2003 | Steele et al. | 455/405 |
| 6,577,717 B1 | * | 6/2003 | Henon | 379/114.01 |
| 6,622,017 B1 | * | 9/2003 | Hoffman | 455/419 |
| 6,782,253 B1 | * | 8/2004 | Shteyn et al. | 455/414.1 |
| 2002/0045441 A1 | * | 4/2002 | Ralston et al. | 455/418 |
| 2002/0107000 A1 | * | 8/2002 | Goss et al. | 455/405 |
| 2002/0183051 A1 | * | 12/2002 | Poor et al. | 455/418 |
| 2004/0043763 A1 | * | 3/2004 | Minear et al. | 455/419 |
| 2004/0123147 A1 | * | 6/2004 | White | 713/201 |
| 2004/0132438 A1 | * | 7/2004 | White | 455/418 |
| 2004/0132449 A1 | * | 7/2004 | Kowarsch | 455/432.1 |
| 2004/0142682 A1 | * | 7/2004 | Kamiya et al. | 455/418 |

* cited by examiner

*Primary Examiner*—Binh K. Tieu
(74) *Attorney, Agent, or Firm*—Perkins Coie LLP (57) ABSTRACT

Disclosed embodiments include a mobile communication device that automatically receives signals indicating predetermined events, and automatically takes actions in response to the events. The actions include executing one or more software applications on the device. The applications include native applications and downloaded applications that are individually configured.

46 Claims, 6 Drawing Sheets

CONDITIONAL APPLICATION INVOCATION IN A WIRELESS DEVICE

RELATED APPLICATIONS

The present application is related to U.S. application Ser. No. 10/324,354 filed on Dec. 19, 2002, U.S. application Ser. No. 10/324,159 filed on Dec. 19, 2002, and U.S. application Ser. No. 10/324,870 filed Dec. 19, 2002, all commonly assigned to Cingular Wireless II, LLC and incorporated by reference in their entirety.

BACKGROUND

The disclosed embodiments relate to configuring a wireless device to automatically invoke various applications based on the occurrence of events or conditions.

Current wireless communication devices such as cellular phones and various handheld devices typically include one or more "native" application programs stored on the device by the manufacture to perform specific functions. For example, cellular phones have a call controller native application that receives and recognizes keypad inputs and responds appropriately. If the keypad entry is a valid phone number, the call controller responds by attempting to establish a communication channel with the device identified by the number.

At present, remote execution of applications on a device is done by determining, at the provider side, what the device is to do, under what conditions the device is to do it, and what applications will be executed. Currently, a signal can be sent to a device to cause the device to take a predefined action. A small subset of these actions can be invoked remotely by the user or the wireless service carrier, or provider. For example, a short message service ("SMS") message can invoke a particular program.

As a more detailed example, some handheld devices can receive a signal that causes the device to notify the user a certain stock price has been reached. This is an example of a specific application on the wireless device performing a particular action in response to a predetermined signal. On the provider side, in response to an event (the stock reaching a predetermined price), a provider merely creates a text message and sends it to the device for display. The human user must read the message and decide how to act on it.

The ability of the user to configure automatic device behavior and the ability to remotely invoke application on a device is very limited. Currently, remote device configuration is typically done by the provider at a level below the application level. Another limitation of the current server-side remote device application invocation is the provider must know what applications are on the device and how each is configured. This does not usually present a problem because most devices, for example most cellular phones, do not store applications other than the native applications installed by the provider. In the near future, most or all cellular phones and other mobile devices will support user-downloaded applications from various third parties. Each of these downloaded applications must be configured individually by the user. Each user may configure an application differently on a device. The variety of configurations is potentially unlimited. Therefore, the current model of provider remote invocation of device behavior becomes unworkable with downloadable applications because the provider no longer knows what the device is capable of, or exactly how it performs tasks it is capable of.

Overall, there is a need for an improved user-configurable wireless device that recognizes events and conditions specified by the user and automatically performs a series of user user-configured actions using one or more user-configured applications.

DETAILED DESCRIPTION

Embodiments of the invention, described below, include a mobile communication device that automatically receives signals indicating events, and automatically takes actions in response to the events. The actions include executing one or more software applications on the device. The applications include, native applications and downloaded applications that are individually configured. The events and the actions taken are configurable by a user of the device. In one embodiment, the user configures preferences that are stored by a wireless communication service carrier or provider. The provider remotely updates configuration data in the device transparently to the user. In an embodiment, the configuration data includes a list of events recognized by the device, and a list that relates those events to applications to be executed in response to the events. After the configuration data is updated, the wireless device communicates with the provider network such that each of the recognized events automatically causes desired device behavior without intervention by the user. Depending on the class of the device, communication and device behavior as described herein can occur during, or not during, a voice connection. In the latter case, the communication is queued until the voice connection is closed. The communication and behavior does not occur when the device is powered down.

Figure 1:
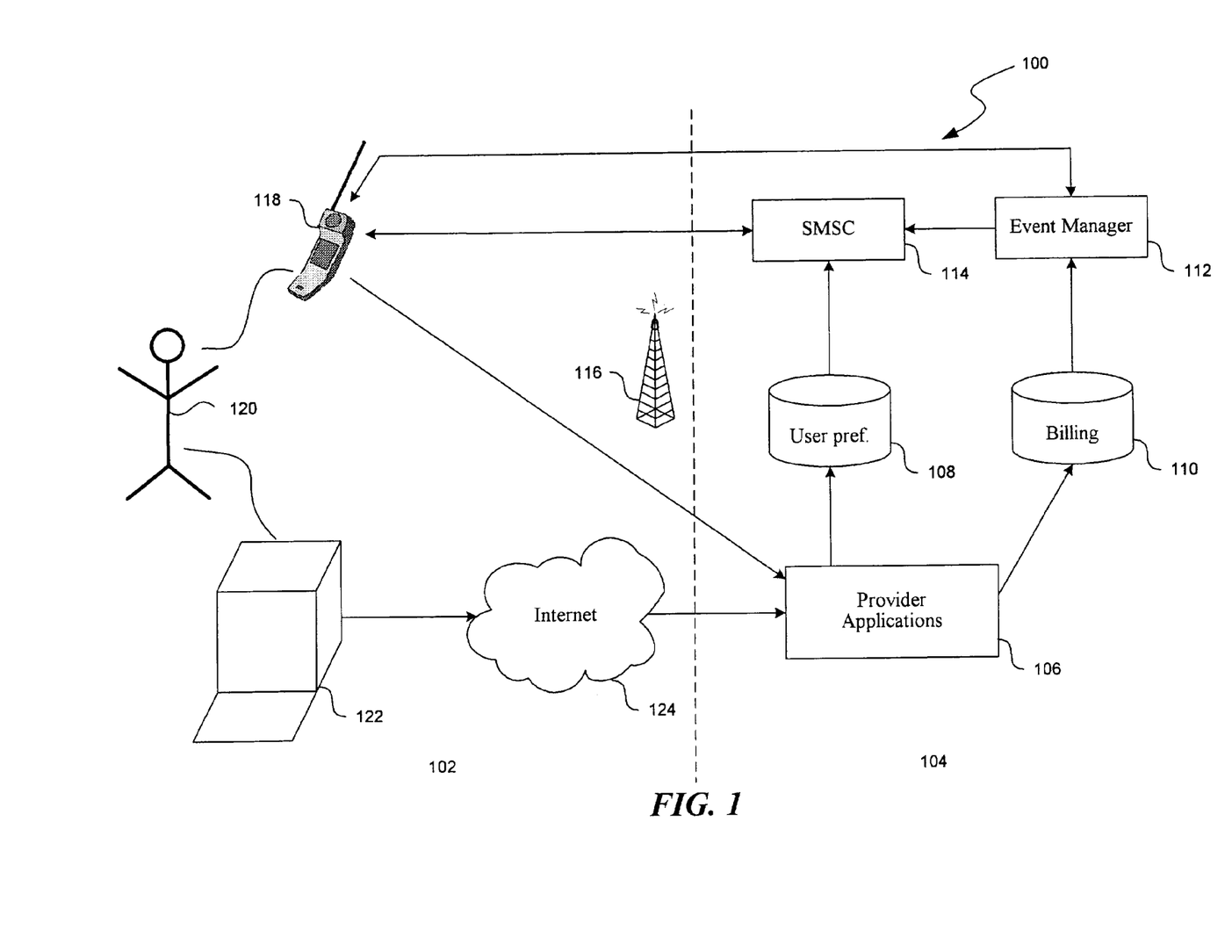
FIG. 1 is a diagram of an embodiment of a wireless communication system.

FIG. 1 is a diagram of an embodiment of a wireless communication system 100. The system 100 is arbitrarily divided into two areas. Area 104 includes equipment and applications ("provider equipment") typically provided and maintained by a wireless communication service provider, such as a cellular phone service provider. Area 102 includes equipment and applications (with the exception of radio tower 116) that are typically not provided or maintained by the provider, but are designed to communicate on a wireless network with the provider equipment. System 100 is an example of one arrangement of elements, but others are possible. A cellular phone service provider is one example of a provider, but other examples include any wireless service provider that provides wireless communication capabilities through a user device over a wireless network. For example, service providers that support personal digital assistants ("PDAs") are also providers for purposes of the embodiments described.

The area 104 includes various elements useful to illustrate embodiments. Many typically known elements of provider equipment are not shown because they do not add to the understanding of the embodiments. Provider applications 106 are software applications that maintain and administer the network. For example, the applications 106 include billing applications, performance monitoring applications, and many more. The applications 106 include applications that track user accounts, typically designated by a responsible billing party. The account may include one user with one device, or a group of many users each with a device. For example, some enterprises provide groups of employees with devices for limited or unlimited use in the course of employment.

The area 104 further includes a database or databases 108 and 110. The databases 108 and 110 are shown separately to distinguish the types of data stored, but could be one physical entity or more than two physical entities. The database 110 is a billing database that stores data used by the provider to generate bills for an account. Billing data includes minutes used at different rates, and the number of minutes allowed in a time period before special rates apply, for example.

A user preferences database 108 stores a user's choices regarding what events the user would like the device to be automatically notified of. The user preference database also includes actions the user would like the device to take when an event occurs. One example is the device automatically blocking all outbound calls upon the transition from off-peak billing rate time to on-peak billing rate time.

A short message service controller ("SMSC") 114 manages short messaging, including receiving/sending, generating, and encoding/decoding SMS messages. The wireless communication device 118 communicates over the wireless network using radio towers such as radio tower 116 in the known manner. An event manager 112 recognizes events and sends a message to the SMSC in response.

A user 120 of a wireless communication device 118 may configure the user preferences by accessing a dedicated provider configuration application (one of the applications 106). The applications 106 may be accessed using the device 118, or using a personal computer 122 to access the application 106 via the Internet 124. The user preferences are developed by the provider configuration application based on user inputs and downloaded from the provider to the device 118. The device 118 includes downloaded applications (not shown in FIG. 1) that may come from the provider or any third party. Downloaded applications from the provider may be configured in the same way as preferences, as described. Downloaded applications from third parties may be configured in any way dictated by the third party source. The provider has no knowledge of the configuration of the third party downloaded applications or their individual configurations. The user 120, however, knows which downloaded applications are present on the device 118 and how they are configured to behave. The user 120 can therefore configure the user preferences accordingly. For example, the user may configure the user preferences such that a downloaded email application only sends or receives emails during an off-peak period.

Figure 2:
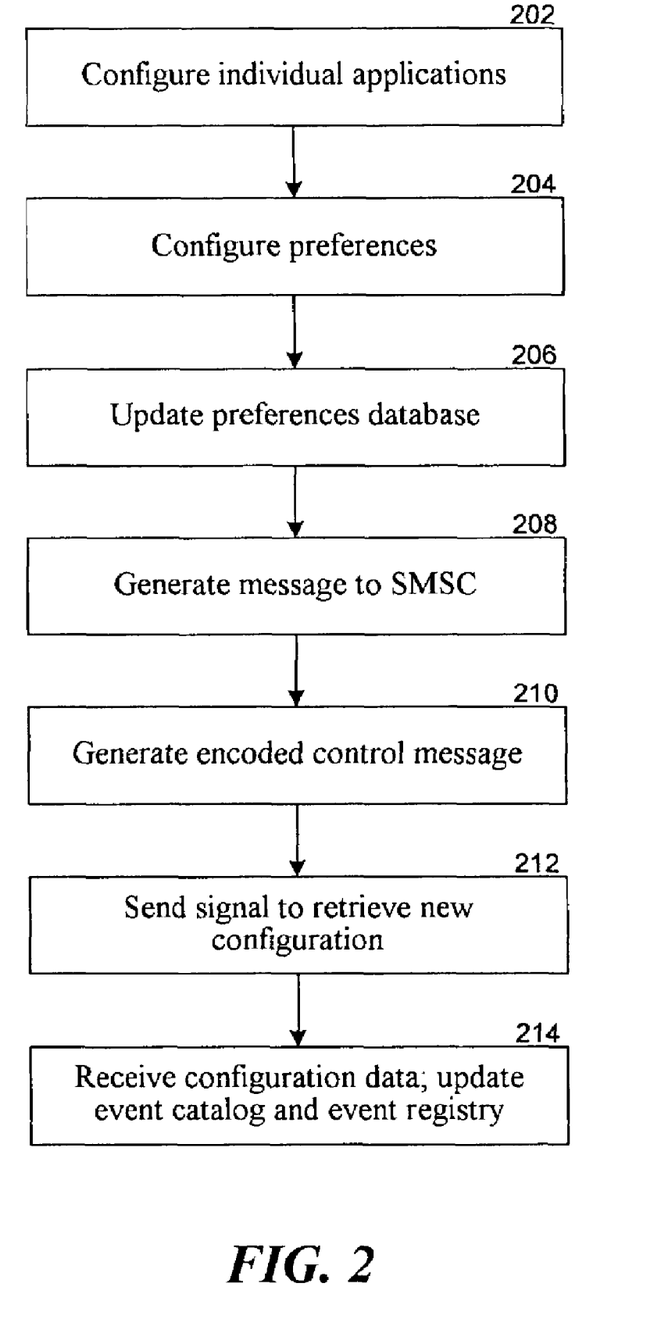
FIG. 2 is a flow diagram of one embodiment of device configuration.

FIG. 2 is a flow diagram illustrating an embodiment of the device 118 configuration. Referring to FIG. 1 and FIG. 2, at 202 the user individually configures the downloaded applications on the device 118. Then, the user configures the user preferences at 204, and the user preferences are stored (at 206) in the database 108. When a new user configuration is stored for an account, a message is sent to the short message service controller ("SMSC") 114 at 208. At 210, the SMSC 114 generates an encoded SMS message to the device 118 that indicates a new user configuration is available to be downloaded. At 212, the device 118 opens a communication channel to the provider equipment 104 to retrieve the new configuration data. In one embodiment, the encoded message reaches the device 118, indicating that the device 118 is receiving a general packet radio service ("GRPS") signal. In one embodiment, the condition "Home GPRS Available" is in the signal. The device 118 invokes a Java application management service ("JAMS", described further below), which looks for applications with a "Refresh when new data connection becomes available" flag set. The indicated applications start and perform data refreshes. The user need not take any actions. The new configuration data is received, and a condition catalog and a condition registry (described below) are updated at 214.

For the purpose of device 118 configuration, out-of-band signals are exchanged between the device 118 and the provider equipment, although in-band signaling could be used. These signals may be exchanged via a hypertext transfer protocol ("HTTP") connection, a wireless application protocol ("WAP") connection, or any other wireless communication method.

Figure 3:
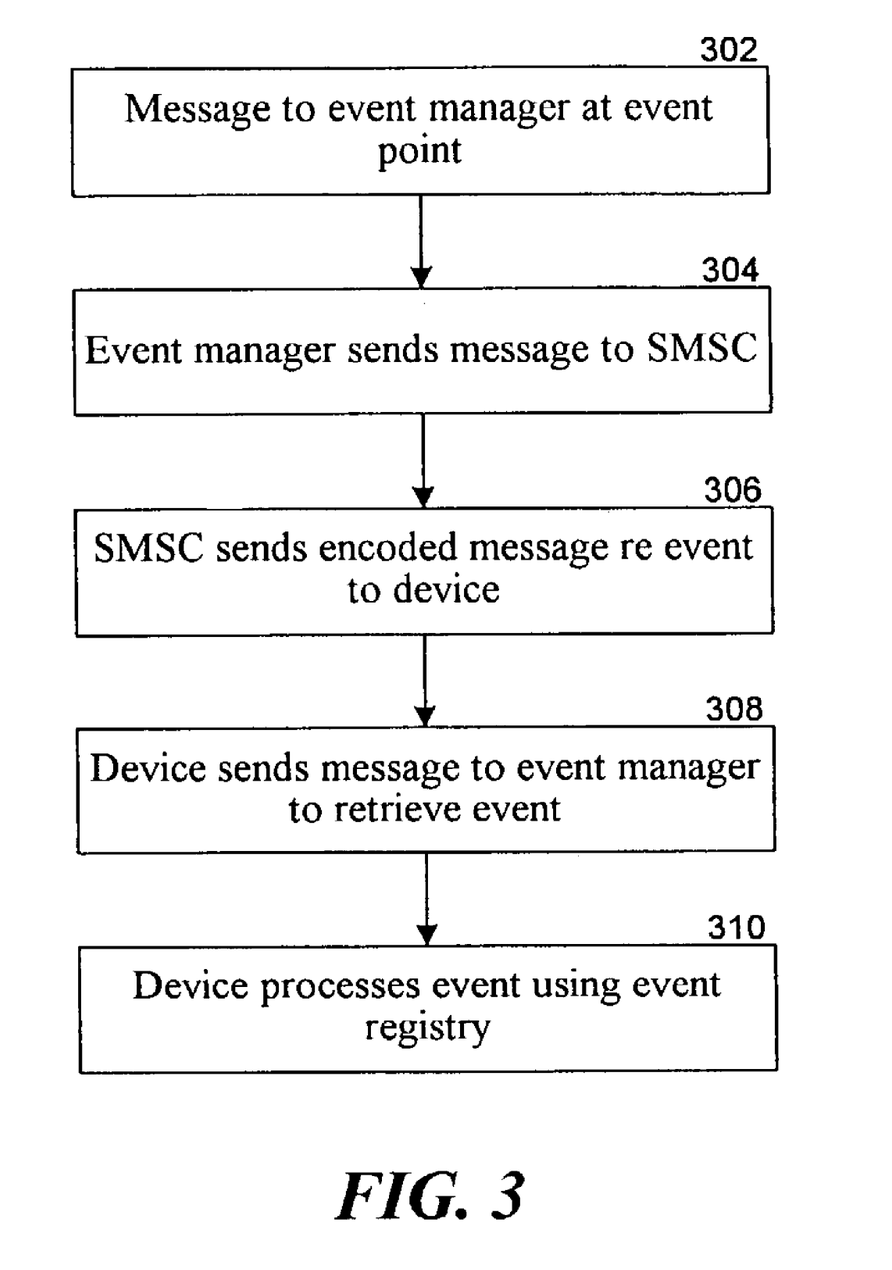
FIG. 3 is a flow diagram of one embodiment of remote application invocation.

FIG. 3 is a flow diagram illustrating an example of automatic conditional application invocation. Referring to FIG. 1 and FIG. 3, At 302, a message is sent to the event manager 112 to indicate that a specific event has taken place. As one example, the billing database 110 sends a message to the event manager 112 that indicates a minute "bucket" for the account has only ten more minutes left in it. At 304, the event manager 112 sends a message to the SMSC 114 requesting that an encoded message be generated. The SMSC encodes the message and sends it to the device 118 at 306. At 308, the device 118 receives and decodes the message, and sends a return message to retrieve the event from the event manager 112. At 310, the device 118 receives the event from the event manager 112 and processes the event using an event registry as described below. In an alternative embodiment, the SMS message sent to the device on the occurrence of an event includes the information regarding the event. In this embodiment, therefore, the device does not retrieve the event from the event manager.

Figure 4:
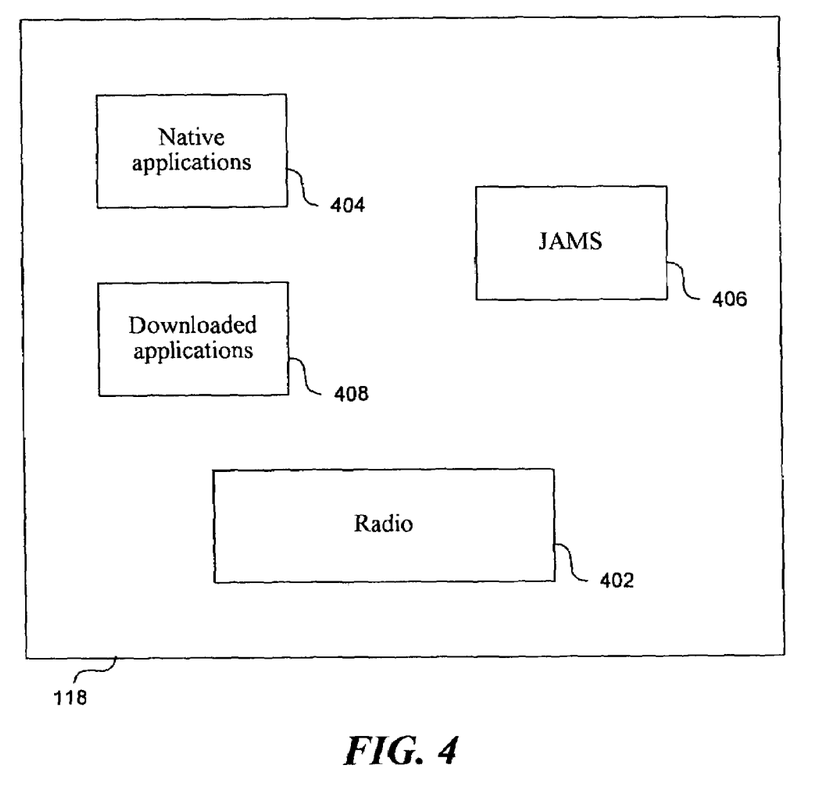
FIG. 4 is a diagram of an embodiment of a wireless communication device.

FIG. 4 is a block diagram of an embodiment of the device 118. The device 118 includes native applications 404, and downloaded applications 408. Radio 402 includes the hardware and software required to communicate over the wireless network. A JAMS 406 includes Java programs and Java program management capability.

Figure 5:
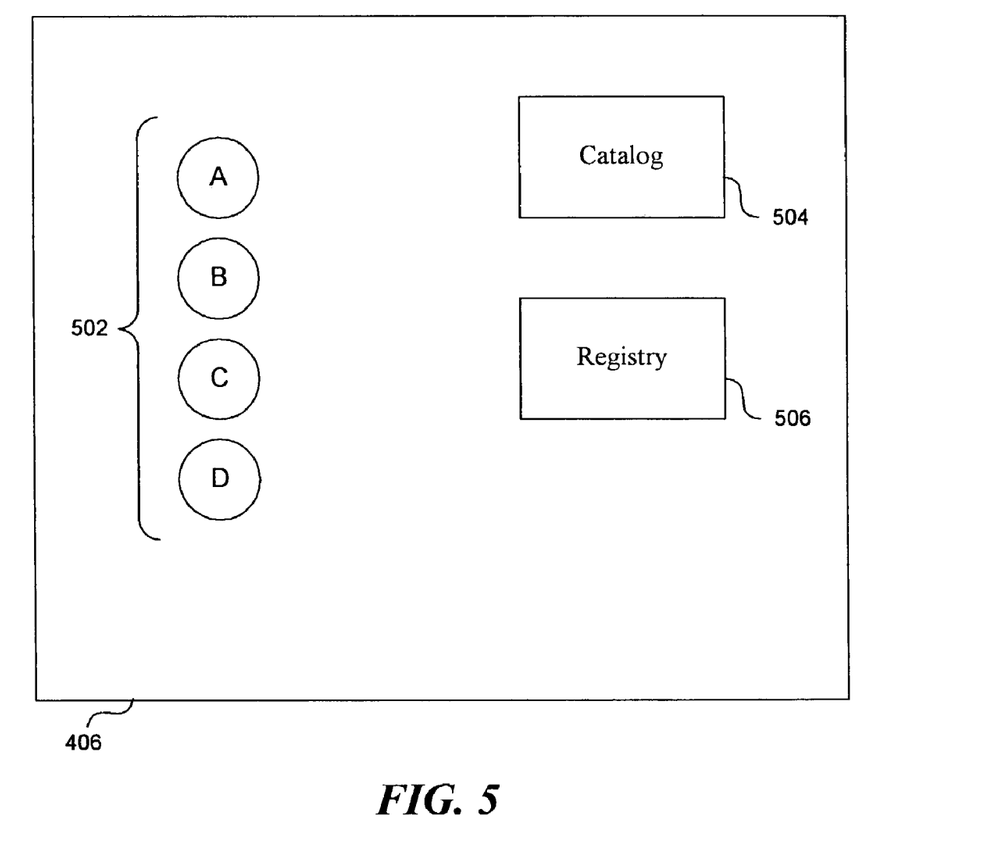
FIG. 5 is a diagram of an embodiment of a Java application management service ("JAMS").

FIG. 5 is a block diagram of the JAMS 406 in one embodiment. The JAMS 406 includes downloaded Java applications 502 designated A, B, C, and D. The number of downloaded Java applications shown is an arbitrary example. The actual number of downloaded Java applications stored can be greater or less than four, and is only limited by storage capacity. The JAMS 406 also stores an event catalog 504 and an event registry 506.

Figure 6:
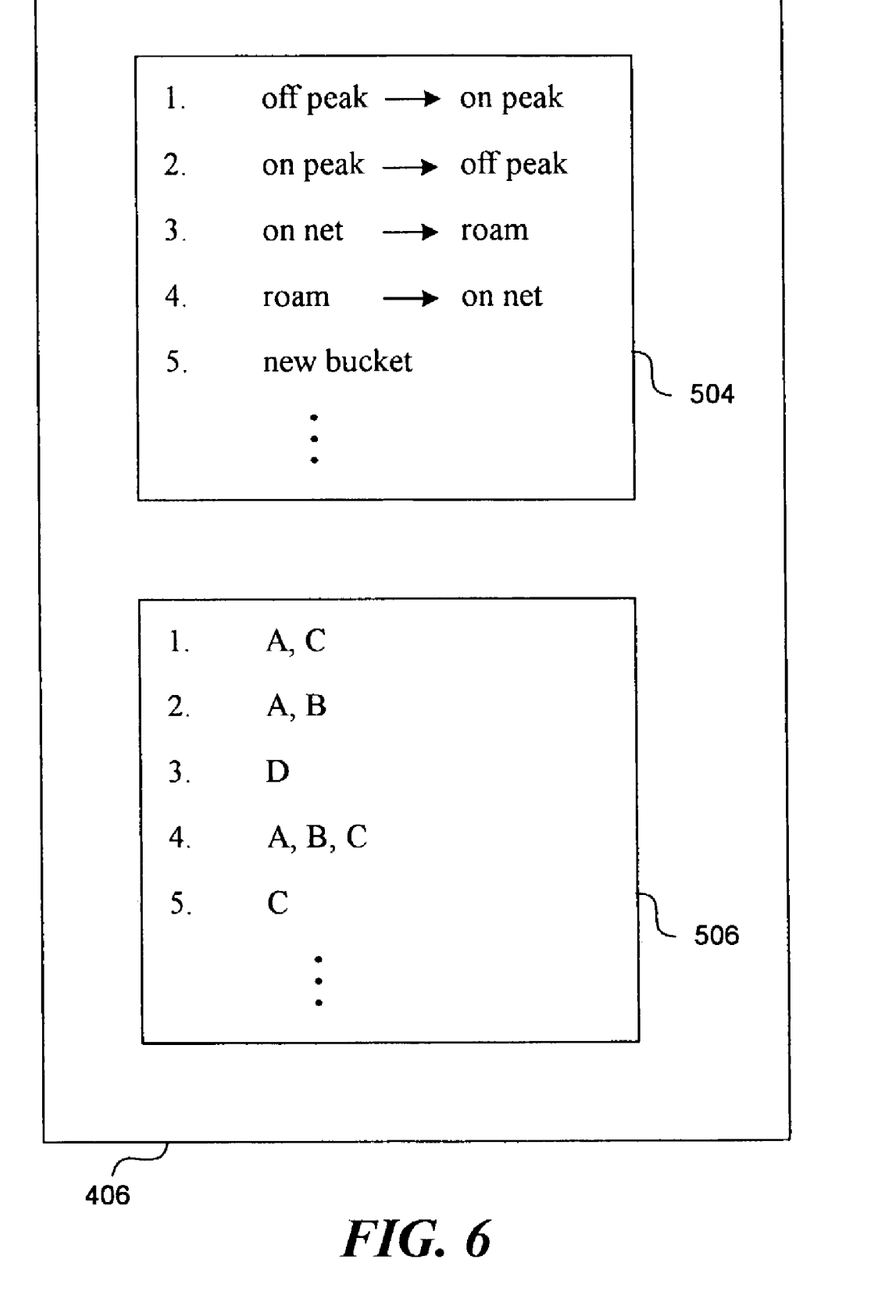
FIG. 6 is another diagram of an embodiment of a wireless communication device.

FIG. 6 is another block diagram of the JAMS 406 showing more detail of the event catalog 504 and the event registry 506. The event catalog 504 includes a list of events recognized by the device 118. The event catalog is populated when the user downloads new user preferences as previously described. Some examples of events are the transition from off-peak time to on-peak time and the reverse, the transition from being on the network to roaming and the reverse, and the occurrence of a new bucket for the account. The events shown are a subset of possible events that can be recognized by the device 118. The event registry 506 includes a list of the events recognized by the device 118 for each event, and which downloadable Java applications (A, B, C, and/or D) should be executed when the event occurs. For example, when event 1 (off-peak to on-peak transition) occurs, application A and C are executed. Application A may be an application that generates a user message that the transition is occurring, while application C may block outgoing calls automatically (subject to user override). In other embodiments, the applications listed in the event registry include native applications as well as downloaded applications. In other embodiments, the event catalog and event registry do not reside on the JAMS, but reside elsewhere on the device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application.

The above detailed descriptions of embodiments of the invention are not intended to be exhaustive or to limit the invention to the precise form disclosed above. While specific embodiments of, and examples for, the invention are described above for illustrative purposes, various modifications are possible within the scope of the invention, as those skilled in the relevant art will recognize. For example, while steps are presented in a given order, alternative embodiments may perform routines having steps in a different order. The teachings of the invention provided herein can be applied to other systems, not necessarily only wireless communication system described herein. The various embodiments described herein can be combined to provide further embodiments.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a computer-readable medium, other aspects may likewise be embodied in a computer-readable medium. Accordingly, the inventors reserve the right to add additional claims after filing the application to pursue such additional claim forms for other aspects of the invention.

I claim:

1. A wireless communication system, comprising:
    wireless communication provider equipment, comprising
        a storage device that stores provider software applications and data, including an event manager application and a short message service controller (SMSC) application;
    a wireless communication device coupled to the provider equipment, comprising,
        more than one software application, including native applications and downloaded applications, wherein the downloaded applications are individually configured by a wireless device user, including defining user preferences;
        an event catalog that stores a list of user-specified events; and
        an event registry that stores relationships between events and actions, wherein the relationships between the events and the actions are based at least in part on at least some of the defined user preferences, wherein the wireless device receives notification of an event from the SMSC of the provider equipment, wherein the event is not associated with a load condition of the provider equipment, and wherein at least one of the downloaded applications automatically performs one or more of the actions in response to the event.

2. The wireless communication system of claim 1 wherein:
    the event manager is configured to recognize the occurrence of an event and send a message to the SMSC: and
    the SMSC is configured to generate an encoded SMS message to the wireless device that indicates the event has occurred.

3. The wireless communication system of claim 1 wherein the wireless device is configured to:
    receive an encoded SMS message from the SMSC indicating an event has occurred;
    determine from the event registry which applications should be executed in response to the event; and
    execute the indicated applications.

4. The wireless communication system of claim 1, wherein the wireless device is configured to communicate with a provider software application for allowing the user to define the user preferences, wherein communication includes communication via the Internet.

5. The wireless communication system of claim 1, wherein the native applications include a call controller application.

6. The wireless communication system of claim 1, wherein the native applications include a call controller application and the downloaded applications include an email application, an address book application, a custom ring application, a game application, and a media application.

7. A wireless communication system, comprising:
    a wireless communication network administered by a carrier;
    a wireless device that communicates with the carrier through a wireless network, wherein the wireless device comprises more than one software application, including at least one downloaded application, wherein the wireless communication network notifies the wireless device of an event associated with a customer's use and the wireless device responds by executing one or more of the software applications, including the at least one downloaded application according to previously configured user preferences, and wherein the event is not associated with a load condition of the wireless communication network.

8. The wireless communication system of claim 7, wherein the wireless device further comprises:
    an event catalog that includes events recognized by the wireless device; and
    an event registry that related events to actions to be taken by the wireless device, wherein the event catalog and the event registry are populated according to the user preferences.

9. The wireless communication system of claim 7, further comprising carrier-side equipment including a carrier application remotely accessed by the user to configure the user preferences.

10. The wireless communication system of claim 7, further comprising carrier-side equipment including an event manager configured to send a message to the wireless device when a predefined event occurs.

11. The wireless communication system of claim 7, further comprising carrier-side equipment, including:
   an event manager configured to recognize an event and generate a message; and
   a SMSC configured to receive the message and generate an encoded message to the wireless device indicating the occurrence of the predefined event.

12. The wireless communication system of claim 7, further comprising carrier-side equipment, including:
   a carrier application remotely accessed by the user to configure the user preferences; and
   a preferences database that stores the user preferences.

13. The wireless communication system of claim 7, wherein the event comprises:
   the user's billing rate transitioning from an on-peak rate to an off-peak rate;
   the user's billing rate transitioning from an off-peak rate to an on-peak rate;
   the wireless device transitioning to roaming for service;
   the wireless device transitioning from roaming for service;
   a certain amount of time remaining in a current time increment bucket; and
   a start of a new time increment bucket.

14. A wireless mobile device, comprising:
   at least one software application;
   a list of events recognized by the device;
   a list of relationships between the events and actions to be taken by the device, wherein the device is configured to automatically receive an event notification from an external source and take actions according to the list of relationships, wherein the actions comprise executing at least one downloaded software application, and wherein the event is not associated with a load condition of a wireless communication network through which the device operates.

15. The wireless mobile device of claim 14, wherein the at least one software application includes native applications and downloaded applications, and wherein the list of events and the list of relationships are stored in a Java application management service (JAMS).

16. The wireless mobile device of claim 14, wherein the device is configured to communicate with a wireless communication service provider to allow a device user to configure preferences regarding the actions taken by the device in response to events.

17. The wireless mobile device of claim 14, wherein the device is configured to:
   communicate with a wireless communication service provider to allow a device user to configure preferences regarding the actions taken by the device in response to events;
   receive a signal from the provider indicating that preferences have been changed;
   in response to the signal, initiate communication with the provider; and
   retrieve new configuration information from the provider, including changes to the list of relationships and changes to the list of events.

18. The wireless mobile device of claim 14, wherein the device is configured to:
   receive an encoded message from a wireless communication service provider indicating that an event has occurred;
   open a communication channel to the provider to retrieve the event; and
   process the event using the list of events and the list of relationships.

19. The wireless mobile device of claim 17, wherein the signal is an encoded short message service ("SMS") message, and wherein the new configuration information is retrieved via a general packet radio service ("GPRS") connection.

20. The wireless mobile device of claim 17, wherein the encoded message is an encoded short message service ("SMS") message, and wherein opening a communication channel includes establishing a connection chosen from a group comprising a hypertext transfer protocol ("HTTP") connection and a wireless application protocol ("WAP") connection.

21. A wireless communication system, comprising:
   a wireless communication network means administered by a carrier;
   a wireless device means that communicates with the carrier through a wireless network, wherein the wireless device means comprises more than one software application, including native applications and downloaded applications, and wherein the wireless communication network means notifies the wireless device means of an event and the wireless device means responds by executing one or more of the software applications according to previously configured user preferences, including at least one of the downloaded applications, and wherein the event is not associated with a load condition of the wireless network.

22. The wireless communication system of claim 21, wherein the wireless device means further comprises:
   an event catalog means that includes events recognized by the wireless device means; and
   an event registry means that related events to actions to be taken by the wireless device means, wherein the event catalog means and the event registry means are populated according to the user preferences.

23. The wireless communication system of claim 21, further comprising carrier-side equipment means including a carrier application remotely accessed by the user to configure the user preferences.

24. The wireless communication system of claim 21, further comprising carrier-side equipment means including an event manager means configured to send a message to the wireless device means when a predefined event occurs.

25. The wireless communication system of claim 21, further comprising carrier-side equipment means, including:
   an event manager means configured to recognize an event and generate a message; and
   a message controller means configured to receive the message and generate an encoded message to the wireless device means indicating the occurrence of the predefined event.

26. The wireless communication system of claim 21, further comprising carrier-side equipment means, including:
   a carrier application remotely accessed by the user to configure the user preferences; and
   a storage means that stores the user preferences.

27. The wireless communication system of claim 21, wherein the event comprises:

the user's billing rate transitioning from an on-peak rate to an off-peak rate;

the user's billing rate transitioning from an off-peak rate to an on-peak rate;

the wireless device means transitioning to roaming for service;

the wireless device means transitioning from roaming for service;

a certain amount of time remaining in a current time increment bucket; and a start of a new time increment bucket.

28. A method for configuring a wireless communication device to automatically perform actions in response to an event, the method comprising:

receiving user input including:

configuration information for at least one downloaded application; and preference information including actions to be taken by the device in response to events;

receiving a message from a wireless communication service provider indicating a change in preference information;

initiating a data session with the provider;

retrieving preference information and updating data in the wireless device, wherein the data in the wireless device includes recognized events, and applications to be executed in response to the recognized events, wherein the applications include the at least one downloaded application.

29. The method of claim 28, wherein the configuration information for the at least one downloaded application comprises different information for each of the downloaded applications, and wherein the user input has a plurality of sources that vary according to a particular downloaded application.

30. The method of claim 28, wherein the user input is input through a user interface of the device.

31. The method of claim 28, wherein the user input is input to the device through an Internet user interface.

32. The method of claim 28, wherein the user input is input to the device via a data connection initiated by the provider.

33. A method for wireless communication, comprising:

at a wireless communication network, notifying a wireless device of an event; and at the wireless device, responding by executing one or more software applications according to previously configured user preferences, wherein the one or more software applications includes one or more downloaded applications individually configured by a user after downloading to the wireless device.

34. The method of claim 33, wherein the device responding comprises:

accessing an event catalog that includes events recognized by the wireless device; and accessing an event registry that related events to actions to be taken by the wireless device, wherein the event catalog and the event registry are populated according to the user preferences.

35. The method of claim 33, further comprising the user remotely accessing a network provider application to configure the user preferences.

36. The method of claim 33, wherein notifying comprises a network provider event manager sending a message to the wireless device when the event occurs.

37. The method of claim 33, wherein notifying comprises:

a network provider event manager recognizing an event and generating a message to a message controller; and the message controller generating an encoded message to the wireless device indicating the occurrence of the event.

38. The method of claim 33, further comprising:

the user remotely accessing a network provider application to configure the user preferences; and the provider storing the user preferences in a user preferences database.

39. The method of claim 33, wherein the event comprises:

the user's billing rate transitioning from an on-peak rate to an off-peak rate;

the user's billing rate transitioning from an off-peak rate to an on-peak rate;

the wireless device transitioning to roaming for service;

the wireless device transitioning from roaming for service;

a certain amount of time remaining in a current time increment bucket; and a start of a new time increment bucket.

40. A device-readable medium having instructions stored thereon, that when executed by a processor cause the processor to perform the method comprising:

notify a wireless device of an event; and in response to the notification, execute one or more software applications on the wireless device according to previously configured user preferences, wherein the one or more software applications includes one or more downloaded applications individually configured by a user.

41. The device-readable medium of claim 40, wherein the responding to the notification comprises:

accessing an event catalog that includes events recognized by the wireless device; and accessing an event registry that relates events to actions to be taken by the wireless device, wherein the event catalog and the event registry are populated according to the user preferences.

42. The device-readable medium of claim 40, further comprising receiving data inputs from the user remotely accessing a network provider application to configure the user preferences.

43. The device-readable medium of claim 40, wherein notifying comprises sending a message to the wireless device when the event occurs.

44. The device-readable medium of claim 40, wherein notifying comprises:

a network provider event manager recognizing an event and generating a message to a message controller; and the message controller generating an encoded message to the wireless device indicating the occurrence of the event.

45. The device-readable medium of claim 40, further comprising:

receiving data input from the user remotely accessing a network provider application to configure the user preferences; and storing the user preferences in a user preferences database.

46. The device-readable medium of claim 40, wherein the event comprises:

the user's billing rate transitioning from an on-peak rate to an off-peak rate;

the user's billing rate transitioning from an off-peak rate to an on-peak rate;
the wireless device transitioning to roaming for service;
the wireless device transitioning from roaming for service;

a certain amount of time remaining in a current time increment bucket; and
a start of a new time increment bucket.

* * * * *

UNITED STATES PATENT AND TRADEMARK OFFICE
CERTIFICATE OF CORRECTION

PATENT NO. : 6,999,749 B2
DATED : February 14, 2006
INVENTOR(S) : Christopher White It is certified that error appears in the above-identified patent and that said Letters Patent is hereby corrected as shown below:

Column 7,
Line 34, insert -- downloaded -- between "one" and "software";
Line 41, insert -- the -- before "at least one".

Signed and Sealed this

Thirtieth Day of May, 2006

JON W. DUDAS
*Director of the United States Patent and Trademark Office*